(12) United States Patent
Lindgren et al.

(10) Patent No.: US 6,442,013 B1
(45) Date of Patent: Aug. 27, 2002

(54) APPARATUS HAVING CAPACITIVE SENSOR

(75) Inventors: Ulf Lindgren; Christian Björk, both of Lund (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 09/597,302

(22) Filed: Jun. 20, 2000

(30) Foreign Application Priority Data

Jun. 21, 1999 (SE) ................................. 9902339

(51) Int. Cl.[7] ............................ H01G 7/00; H01H 47/12
(52) U.S. Cl. ................. 361/280; 361/179; 361/281; 361/181; 340/870.37
(58) Field of Search ..................... 361/280, 281, 361/181, 179; 379/388, 44; 178/19; 324/658, 686, 690; 340/870.37, 870.3, 870.01

(56) References Cited

U.S. PATENT DOCUMENTS

| | | | |
|---|---|---|---|
| 4,016,490 A | * | 4/1977 | Weckenmann et al. ... 324/61 R |
| 5,337,353 A | | 8/1994 | Boie et al. |
| 5,801,340 A | | 9/1998 | Peter |

FOREIGN PATENT DOCUMENTS

| | | | |
|---|---|---|---|
| DE | 3221223 A1 | | 12/1983 |
| GB | 2256772 | * | 12/1992 |

OTHER PUBLICATIONS

Jacob Millman and Arvin Grabel, "Microelectronics", McGraw–Hill International Editions, pp. 666–667. (No date).
PCT International–Type Search Report dated May 31, 2000.

* cited by examiner

*Primary Examiner*—Kim Huynh
(74) *Attorney, Agent, or Firm*—Burns, Doane, Swecker & Mathis, L.L.P.

(57) ABSTRACT

An electronic device (1), e.g. a mobile telephone having a front cover (6) and a capacitive proximity sensor, comprising: a first electrode (9; 27) and a second electrode (8; 21, 20), said first electrode having a large face (11, 12, 13; 29); and detector means connected to the first electrode (9, 27) and the second electrode (8, 21, 20) for detecting the capacitance of the first electrode relatively to the second electrode and for providing a control signal (Vprox) responsive to the capacitance. The large face (11, 12, 13; 29) of the first electrode is inclined relative to the front cover (6).

12 Claims, 3 Drawing Sheets

APPARATUS HAVING CAPACITIVE SENSOR

BACKGROUND OF THE INVENTION

1. Field of the Invention

This invention relates to an electronic device having a front cover and a capacitive proximity sensor, comprising: a first electrode and a second electrode, said first electrode having a large face; and detector means connected to the first electrode and the second electrode for detecting the capacitance of the first electrode relatively to the second electrode and for providing a control signal responsive to the capacitance.

2. Description of Related Art

Capacitive proximity sensors are used in various applications in electronic devices e.g. instead of a push button in a telephone handset. Thereby, a particular function can be activated by e.g. moving a hand in the vicinity of the electronic device.

Systems using capacitive proximity sensors typically measure the capacitance or change in capacitance of an electrode with respect to its environment. That is the electromagnetic field propagating from the electrodes is changed when an object is moved into the field. Thus, it is possible to detect an object which is moved relative to the electrode.

When a capacitive proximity sensor is used in smallsized-hand-held electronic equipment, especially mobile telephones, it is extremely important that the proximity sensor can be incorporated in such small-sized electronic equipment without requiring larger dimensions of the electronic equipment. Typically, it is a requirement that it shall be possible to have access to all functions of the electronic device via a front cover providing access to user interface means such as a display, a keypad, a loudspeaker, etc.

U.S. Pat. No. 5,337,353 discloses a capacitive proximity sensor for use, e.g., in a telephone handset to sense whether an object, e.g., a user, a table, or another object, is in the proximity of the telephone handset. The disclosed proximity sensors include a sensing electrode mounted in parallel to a guard electrode; the electrodes are separated by an insulating layer. The sensing electrode and the guard electrode are driven in unison by an RF signal. The proximity of an object to the sensor is detected by monitoring the RF current flowing through the sensing electrode by means of a bridge coupling.

Despite the fact that numerous embodiments are mentioned or disclosed, the disclosure comprises embodiments in which the electrodes are made as plane electrodes arranged parallel to each other only.

Thus in the prior art, when the proximity sensor is used in small-sized electronic equipment, the proximity sensor will take up a considerable area on the front cover. Alternatively, the electromagnetic field is diminished or disturbed by components such as a loudspeaker, a display, a keypad, etc., since such components typically comprise electrical conductive materials.

Consequently, the prior art involves the problem that the geometry of the electrodes does not have a spatial relationship or shape that allows them to fit into small-sized electronic equipment while providing a sufficient sensitivity of the proximity sensor.

BRIEF SUMMARY OF THE INVENTION

Thus an object of this invention is to provide a proximity sensor with electrodes which are arranged to fit into small-sized electronic equipment while providing a sufficient sensitivity of the proximity sensor.

This is achieved when the device mentioned in the opening paragraph is characterized in that the large face of the first electrode is inclined relatively to the front cover.

Consequently, the electrodes for a capacitor are used to sense proximity. When an object moves closer to the device (i.e. the electrodes) the object will tend to concentrate the electrical flux density; and when the object moves farther away it will separate the lines of flux propagating from one of the electrodes towards the other electrode. The electrical properties of the object are thus used to modulate the capacitance of the capacitor used as a sensing element.

BRIEF DESCRIPTION OF THE SEVERAL VIEWS OF THE DRAWINGS

The invention will be explained more fully below in connection with a preferred embodiment and with reference to the drawing, in which.

DETAILED DESCRIPTION OF THE INVENTION

Figure 1A:
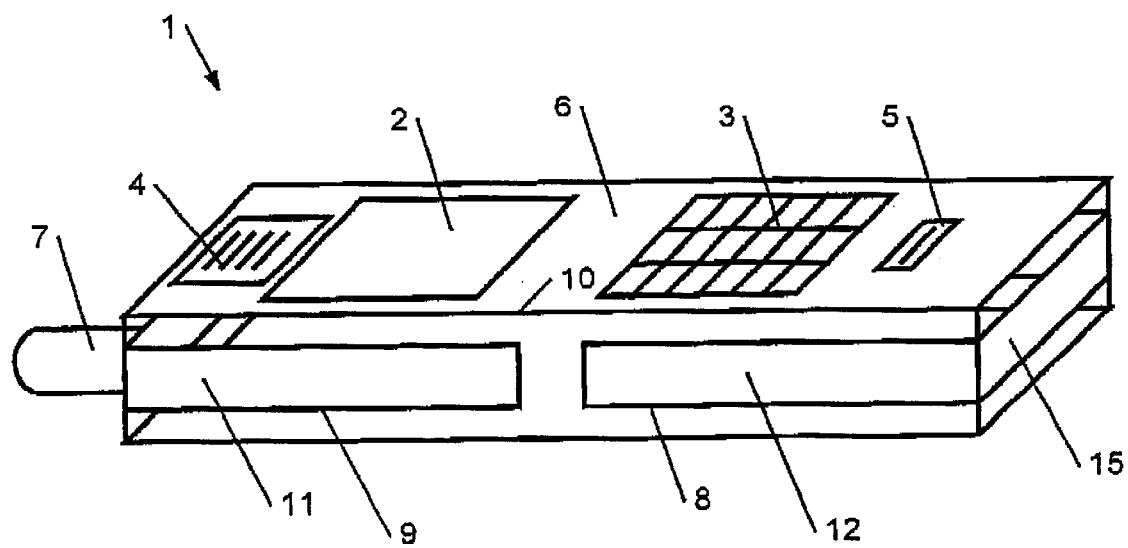
FIG 1a and 1b show a first embodiment of a capacitive proximity sensor according to the invention.

FIG 1a shows a first embodiment of a capacitive proximity sensor according to the invention. A mobile communication device 1, comprises a display 2 and a keypad 3 for operating the mobile communication device. A front cover 6 is adapted to provide access to the display, the keypad, and a loudspeaker (not shown) and a microphone (not shown). The front cover 6 comprises openings 4 and 5 for transmission to/from the loudspeaker and microphone, respectively. The front cover comprises an edge contour 10. In this illustration the edge contour is rectangular, however, this edge contour can be shaped to have more smooth curvatures. This also applies for the front cover which, in the illustration, is shown as a plane surface.

In order to provide wireless communication the mobile communication device comprises an antenna 7. Mobile communication devices with the above mentioned components are well-known in the prior art and will not be discussed further.

According to the invention, the communication device 1 further comprises electrodes 8 and 9 to sense proximity of an object relative to a device. In this embodiment the electrodes are U-shaped; and the U-shaped electrodes 8, 9 are arranged such that the openings of the U-shaped electrodes face each other. Further, the large faces 11, 12, and 15 of the electrodes are perpendicular to the front cover 6. When an object moves farther away from or closer to the device e.g. when user grip around the communication device, the relative capacitance between the two electrodes will change significantly due to the spatial arrangement of the electrodes relatively to each other.

It is noted that the electrodes 8 and 9 only takes up very little space in the interior of the device 1.

Figure 1B:
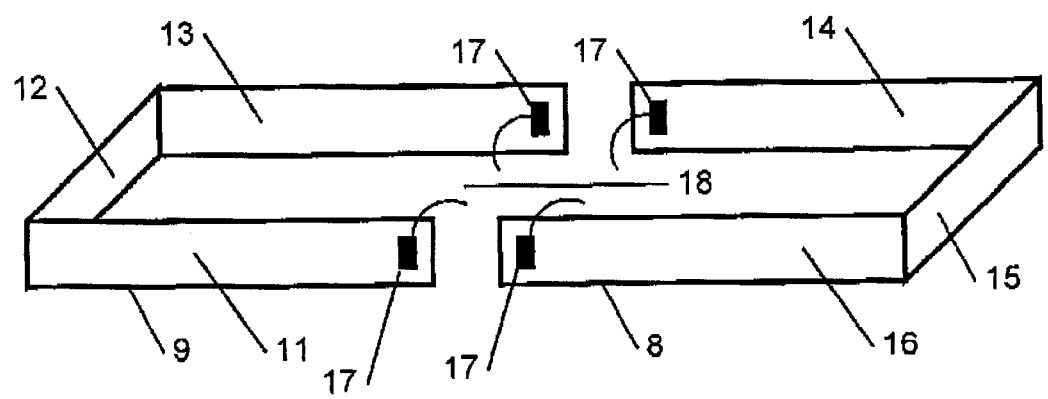

FIG. 1b shows the electrodes also shown in FIG 1a. The electrodes 8 and 9 can be manufactured of an electrical conducting material e.g. copper in the form of a tape that can be shaped to follow the edge contour 10 of the front cover. The tape may have a width of about 5 mm and a thickness of about 0.1 mm. Thus, the electrodes 8 and 9 have large faces 11, 12, 13 and 14, 15, 16, respectively.

In order to connect the electrodes to means (not shown) for determining a capacitance of the electrodes relative to each other, the electrodes comprise electrical terminals 17 in the form of soldering pads, screw terminals or other type of terminal for connecting wires 18. Wires 18 can be used to connect the electrodes to means for determining a capacitance of the electrodes.

Figure 2A:
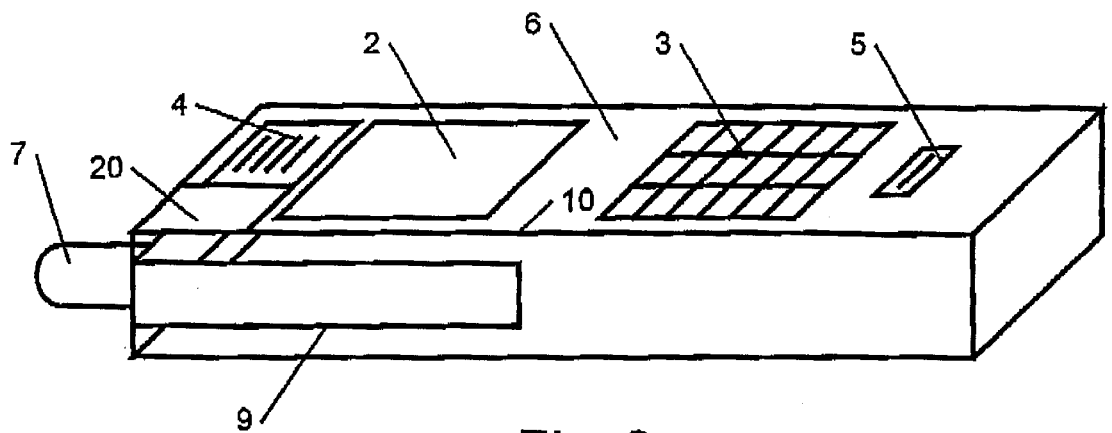
FIGS. 2a, 2b, and 2c show a second embodiment of a capacitive proximity sensor according to the invention.

FIG. 2a show a second embodiment of a capacitive proximity sensor according to the invention. In this embodiment one U-shaped electrode 9 is used in combination with a patched shaped electrode 20 to sense proximity. Also in this embodiment the relative capacitance between the two electrodes will change significantly when an user moves his hand in proximity of the device; this is due to the spatial arrangement of the electrodes relatively to each other.

In a preferred embodiment the electrodes are insulated, at least partially, by means of an insulating or non-conducting surface coating. Thereby, the risk of destroying the electrical circuits in the device caused by static electricity of an object in contact with the device is reduced.

Figure 2B:
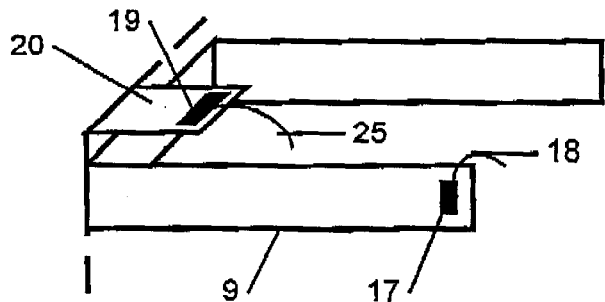

FIG. 2b shows the electrodes also shown in FIG. 2a. The patch electrode 20 can be made of metal plate e.g. a copper plate with a dimension of 10 mm×10 mm×0.2 mm. The patch electrode 20 comprises a terminal 19 to provide connection to means for detecting proximity via a wire 25.

Figure 2C:
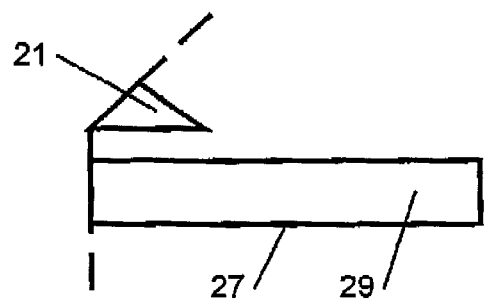

FIG. 2c shows a further embodiment of the electrodes. In this embodiment a first electrode is a patch electrode 21 shaped as a triangle. A second electrode 27 is shaped as a rectangle having a plane face 29. It should be noted that the shape of the individual electrodes can be adapted in various ways to fit into different designs of electronic devices.

Figure 3:
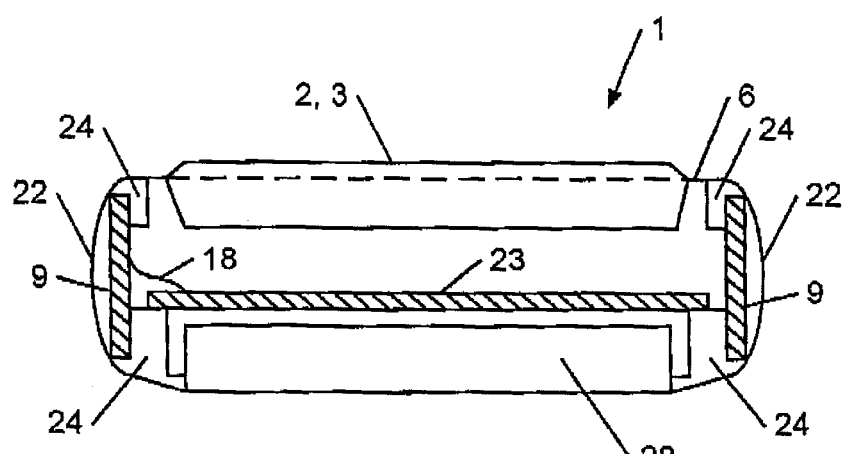
FIG. 3 shows a cross-sectional view through a device with a capacitive proximity sensor according to the invention.

FIG. 3 shows a cross-sectional view through a device with a capacitive proximity sensor according to the invention. The cross-sectional view shows the display 2 and the keypad 3 which are accessible through the front cover 6. In a preferred embodiment the device comprises a housing 22 made of a plastic material and with support means 24 to hold the electrodes 9 and a printed circuit board (PCB) 23 in a fixed position in the device The electrodes 9 are connected to the PCB 23 via wires 18. The BCP comprises a detector circuit connected to the electrodes via the wires 18. The device further comprises a battery container and/or battery 28 to provide battery operating power to the device.

In this embodiment the electrodes are electrically insulated from the exterior by means of the plastic housing 22.

Figure 4:
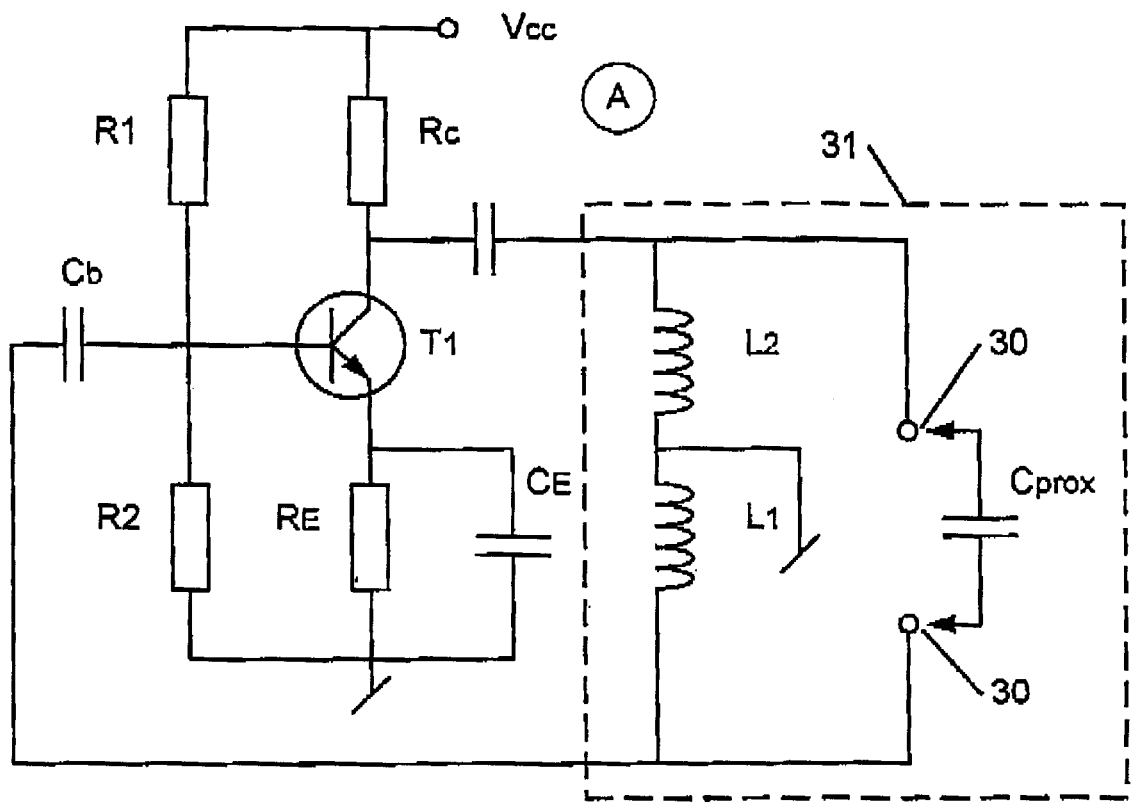
FIG. 4 shows a diagram for an oscillator connected to a capacitor to sense proximity.

FIG. 4 shows a diagram for an oscillator connected to a capacitor to sense proximity. The capacitor Cprox is formed by electrodes 9 and 8 or 20 or 26 according to the invention; the electrodes are connected to the terminals 30 by means of the wires 18. The oscillator is supplied with a voltage power supply Vcc, e.g. a battery. The resistors Rc and RE provide a load condition that allows the transistor T1 to operate in an expedient current/voltage range. The resistors R1 and R2 provides a DC bias current to the basis of the transistor T1. The capacitor CE is connected to bypass the resistor RE with respect to AC, i.e. the oscillating signal. The capacitor Cb is connected to provide an AC feed-back signal from the LC-circuit 31 to the basis of transistor T1.

The LC-circuit comprises the coils L1 and L2 and the capacitor Cprox, which represents the capacitance of the electrodes. The LC-circuit is designed according to a desired oscillator frequency. It is known for a person skilled in the art to design an oscillating circuit to oscillate at a desired frequency.

In a preferred embodiment the oscillator is designed to oscillate at a radio frequency of about 100 KHz.

The node designated by a capital 'A' is used to monitor the oscillation of the oscillator in response to the capacitance Cprox.

This oscillator is also known as a so-called 'Hartley Oscillator'; a further description of this and other applicable oscillators can be found in the book: 'Microelectronics, McGraw-Hill International Editions, 1987, Second Edition, by J. Millman and A. Grabel'.

Figure 5:
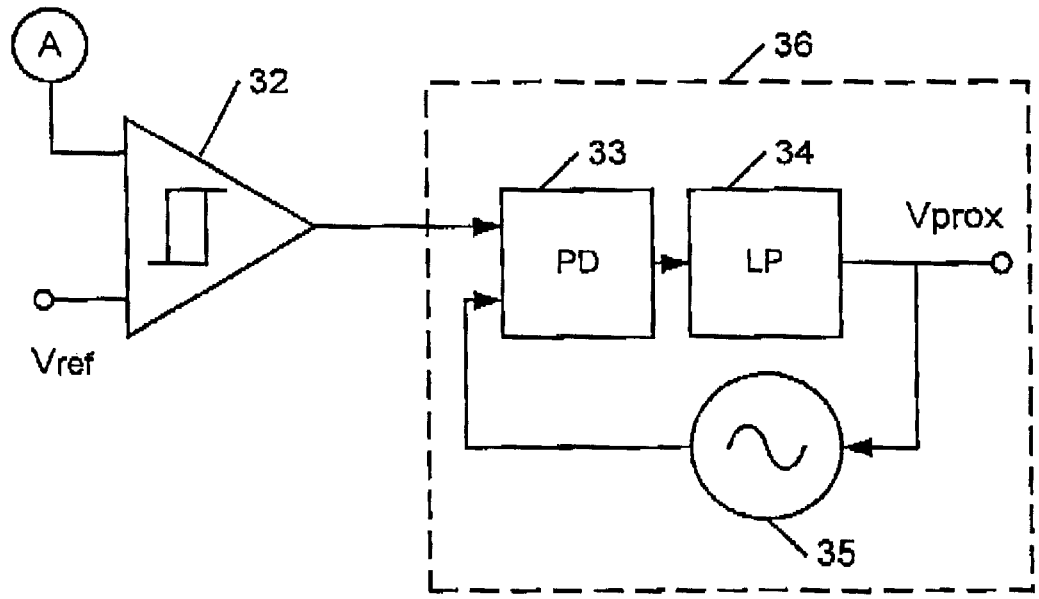
FIG. 5 shows a block diagram comprising signal processing means.

FIG. 5 shows a block diagram comprising signal processing means. The node in the oscillator designated by a capital A is connected to a comparator 32, to compare the voltage level in node A with a reference voltage Vref. The comparator comprises a so-called Schmitt-trigger function. The output of the comparator 32 is in the form of an input square-pulse signal. This input square-pulse signal is supplied to a phase-locked-loop (PLL) 36. The PLL comprises a phase detector 33, a low-pass filter 34, and a voltage-controlled oscillator 35. The PLL provides a control signal Vprox indicative of whether an object is in proximity of the device. The signal processing means may have a threshold unit to provide a one-bit digital signal representing either proximity or no proximity.

The proximity sensor and detector can be used to control various functions e.g. for answering an incoming call, controlling the volume of a loudspeaker, etc.

What is claimed is:

1. An electronic device having a capacitive proximity sensor, comprising:
   a first electrode;
   a second electrode as a part of and parallel to a front cover, said first electrode having a flat surface of the plate; and
   detector means connected to the first electrode and the second electrode for detecting the capacitance of the first electrode relative to the second electrode and for providing a control signal responsive to the capacitance;
   wherein the flat surface of the plate of the first electrode is perpendicular to the front cover.

2. An electronic device according to claim 1, wherein the flat surface of the plate of the first electrode is placed along a side of the device.

3. An electronic device according to claim 1, wherein a flat surface of the plate of the second electrode is arranged parallel to at least a part of the front cover and in close vicinity of the front cover or forms a part of the front cover.

4. An electronic device according to claim 1, wherein the first electrode is U-shaped.

5. An electronic device according to claim 1, wherein the first electrode is arranged to substantially follow at least a part of an edge contour of the device.

6. An electronic device according to claim 1, wherein the second electrode comprises a flat surface of the plate arranged parallel to the front cover.

7. An electronic device according to claim 1, wherein the second electrode is U-shaped.

8. An electronic device according to claim 7, wherein the first and second electrodes are U-shaped and arranged in the device such that the openings of the U-shaped electrodes face each other.

9. An electronic device according to claim 1, wherein the electrodes are insulated from an exterior of the device by means of an electrically insulating material.

10. An electronic device according to claim 1, wherein the detector means comprises an oscillator having an oscillating frequency that depends on the electrical capacity of the electrodes relatively to each other.

11. An electronic device according to claim 1, wherein the device is a mobile telephone.

12. An electronic device having a front cover and a capacitive proximity sensor, comprising:

a first electrode and a second electrode as part of and parallel to the front cover, said first electrode having a large face; and detector means connected to the first electrode and the second electrode for detecting the capacitance of the first electrode relative to the second electrode and for providing a control signal responsive to the capacitance;

wherein the large face of the first electrode is inclined relative to the front cover such that the large front face of the first electrode is perpendicular to the front cover.

* * * * *